United States Patent
Ise

(10) Patent No.: US 8,422,819 B2
(45) Date of Patent: Apr. 16, 2013

(54) IMAGE PROCESSING APPARATUS HAVING A NOISE REDUCTION TECHNIQUE

(75) Inventor: Makoto Ise, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 370 days.

(21) Appl. No.: 12/821,322

(22) Filed: Jun. 23, 2010

(65) Prior Publication Data

US 2011/0013855 A1    Jan. 20, 2011

(30) Foreign Application Priority Data

Jul. 16, 2009 (JP) .................. 2009-168276
Jun. 8, 2010 (JP) .................. 2010-131510

(51) Int. Cl.
*G06K 9/40* (2006.01)
*H04N 5/00* (2011.01)

(52) U.S. Cl.
USPC .......................... 382/275; 348/615

(58) Field of Classification Search .................. None
See application file for complete search history.

(56) References Cited

U.S. PATENT DOCUMENTS

| | | | |
|---|---|---|---|
| 7,623,162 B2 | 11/2009 | Inaba | |
| 7,760,258 B2* | 7/2010 | Huang et al. | 348/294 |
| 8,228,402 B2* | 7/2012 | Egawa | 348/241 |
| 2005/0068439 A1* | 3/2005 | Kozlowski et al. | 348/308 |
| 2006/0132626 A1* | 6/2006 | Sakurai | 348/246 |
| 2006/0192864 A1* | 8/2006 | Mauritzson | 348/241 |
| 2007/0019085 A1* | 1/2007 | Suzuki | 348/241 |
| 2007/0040915 A1* | 2/2007 | Suzuki et al. | 348/222.1 |
| 2008/0259193 A1* | 10/2008 | Toya et al. | 348/300 |
| 2009/0033782 A1* | 2/2009 | Muroshima et al. | 348/308 |

FOREIGN PATENT DOCUMENTS

| JP | 07-067038 | 3/1995 |
|---|---|---|
| JP | 2006-025148 | 1/2006 |

\* cited by examiner

*Primary Examiner* — Randolph I Chu

(74) *Attorney, Agent, or Firm* — Cowan, Liebowitz & Latman, P.C.

(57) ABSTRACT

An image processing apparatus includes a first noise removal unit which removes noise from a pixel signal when a level of the signal falls outside a range defined by first and second threshold levels, a cyclic calculation unit which makes a cyclic calculation based on weighted averaging between signals on an identical column with respect to the signal in which the noise is removed by the first noise removal unit, a column offset detection unit which detects a column offset component for each column based on the calculation result, and a second noise removal unit which performs a noise removal operation with respect to a signal on the identical column using the previously calculated cyclic calculation result when a difference between the previously calculated cyclic calculation value and the current pixel signal value falls outside a range defined by third and fourth threshold levels.

3 Claims, 13 Drawing Sheets

COLUMN OFFSET DETECTION REGION

MEDIAN FILTER FOR HORIZONTAL FIVE PIXELS MEDIAN
$$Md = MIDIUM(P_{n-2}, P_{n-1}, P_n, P_{n+1}, P_{n+2})$$

NOISE REMOVAL USING THRESHOLD LEVELS
IF $P_n-Md > Th1$ or $P_n-Md < Th2$ THEN $X_n = Md$ (SUBSTITUTED BY MEDIAN)

ELSE $X_n = P_n$ (PASSED INTACT)

TO COLUMN AMPLIFIER

IMAGE PROCESSING APPARATUS HAVING A NOISE REDUCTION TECHNIQUE

BACKGROUND OF THE INVENTION

1. Field of the Invention

The present invention relates to a noise reduction technique in an image capture apparatus that captures an object image using a solid-state image sensor.

2. Description of the Related Art

In recent years, image capture apparatus which use memory cards having solid-state memory elements as recording media, and record and play back images captured using solid-state image sensors such as a CCD and CMOS sensor have been extensively developed and have prevailed. Such image capture apparatus are required to enhance resolutions associated with capturing of still images and moving images and to speed up operations. To meet these demands, the frequency of a drive signal required to drive a solid-state image sensor included in a digital camera, and the drive frequencies for an analog signal processing circuit, A/D converter, and subsequent digital signal processing circuit are rapidly speeded up.

Also, simple and convenient image capture operations that suffer fewer failures in various image capture scenes are further demanded. For this purpose, in order to follow a quickly moving object in, for example, a sports scene, or to attain image stabilization in an indoor image capture operation under the low illumination, higher shutter speeds are adopted. In order to allow image capture operations in places such as museums and aquariums where strobe image capture operations are prohibited, image capture apparatus are demanded to have still higher sensitivities.

An output of an image sensor includes noise of column offset components, which appear as vertical stripe-like noise caused by its structure. Such noise will be referred to as column offsets hereinafter. For example, vertical stripe noise due to defects of vertical transfer registers in a CCD sensor, a smear phenomenon which occurs at the time of incidence of strong light, and the like are known. Also, an X-Y address type sensor represented by a CMOS sensor generally has a structure for reading out signals for each selected row from photoelectric conversion elements, which are arranged in matrix, via each of vertical output lines which are common to respective rows and are different for respective columns. For this reason, column offsets readily occur due to variations of element characteristics that are different for respective columns.

FIG. 13 shows a basic circuit arrangement associated with a read-out circuit for one pixel in a general image sensor (CMOS sensor). Referring to FIG. 13, a photodiode 901 accumulates a light signal charge, and a transfer transistor 902 transfers the light signal charge accumulated on the photodiode to a floating diffusion 904. A reset transistor 903 resets the light signal charge accumulated on the photodiode, and the floating diffusion 904 converts the light signal charge into an FD potential. A pixel source-follower 905 reads out the FD potential onto a vertical output line connected to a column amplifier. Since vertical output lines and column amplifiers arranged for respective columns have different characteristic variations for respective columns, column offsets are generated.

The output of the image sensor includes various other noise generation factors: pixel defect noise generated due to the photodiode, reset noise generated due to the reset transistor, and 1/f noise and RTS noise generated due to the pixel source-follower. The reset noise is noise generated when the reset transistor is enabled and is then disabled by supplying a predetermined reference voltage, and can be removed by a state-of-the-art technique such as correlated double sampling (CDS circuit). The 1/f noise and RTS noise are both random noise components generated in processes of trapping and releasing electrons at an interface level of the pixel source-follower. Since the power spectrum density of the 1/f noise is inversely proportional to the frequency, and has a larger power at a lower frequency, the CDS circuit can largely reduce the 1/f noise. However, since the RTS noise is generated to have unspecified time intervals, it remains because the CDS circuit cannot remove it. The pixel defect noise is dark current noise due to an impurity mixed in the photodiode, and may become white spot noise with a very large level depending on the temperature and light signal charge accumulation time. The pixel defect noise also remains since the CDS circuit cannot remove it.

Conventionally, Japanese Patent Laid-Open No. 7-67038 has proposed the following technique. That is, in order to detect and cancel column offsets superposed on an image capture signal, a storage unit, which stores image data for one horizontal period, is arranged, and stores optical black pixels in a vertical direction of the solid-state image sensor by integrating them for a horizontal period. Then, the stored image data for one horizontal period is subtracted from effective pixel data, thereby removing the superposed column offsets.

As another related art, Japanese Patent Laid-Open No. 2006-25148 has proposed the following method. In this method, the influence of defective pixels that exceed a predetermined threshold level is removed from optical black pixels in the vertical direction of the solid-state image sensor, and column offsets are detected, thus enhancing the detection precision of the column offsets.

Furthermore, as a method of detecting column offsets superposed on an image capture signal, the following method has been conventionally examined. That is, image storage units, which store image data for a plurality of horizontal periods, are arranged, and store all optical black pixels in the vertical direction of the solid-state image sensor, and image processing such as a two-dimensional filter is applied to remove noise. Thus, the detection precision of column offsets is enhanced.

As described above, as an image capture apparatus gains still higher sensitivities, a technique for detecting column offsets with higher precision and removing them from an image capture signal is indispensable. However, the example of Japanese Patent Laid-Open No. 7-67038 does not consider any influence of noise other than the column offsets included in a column offset detection region. The example of Japanese Patent Laid-Open No. 2006-25148 has proposed elimination of the influence of defective pixels included in the column offset detection region, but it does not present any practical circuit arrangement and control method required to separate column offset components and other noise components included in a column offset detection region with high precision upon implementation of the invention. Also, this example does not embody any signal processing algorithm.

The method of providing the image storage units (RAMs) used to store image data for a plurality of horizontal periods and applying two-dimensional noise processing using these RAMs having relatively large capacities is very effective as a means for enhancing the detection precision of column offsets. However, this method results in an increase in circuit scale, and leads to high cost, large consumption power, and a bulky apparatus.

SUMMARY OF THE INVENTION

The present invention has been made in consideration of the aforementioned problems, and provides a technique that allows to remove column offsets with high precision by a small circuit scale.

According to the present invention, there is provided an image processing apparatus comprising: a noise removal unit which removes noise from a pixel signal read out from an image sensor on which pixels are arranged in matrix when a level of the signal falls outside a range defined by a first threshold level and a second threshold level with respect to a signal on an identical row; a cyclic calculation unit which makes a cyclic calculation between signals on the same column with respect to the signal in which the noise is removed by the noise removal unit; and a column offset detection unit which detects a column offset component for each column based on a calculation result of the cyclic calculation unit, wherein when a difference between a previously calculated cyclic calculation value and a current pixel signal value falls outside a range defined by a third threshold level and a fourth threshold level upon making the cyclic calculation by the cyclic calculation unit, the column offset detection unit detects the column offset component using a previously calculated cyclic calculation result without making the cyclic calculation using the pixel signal value.

Further features of the present invention will become apparent from the following description of exemplary embodiments with reference to the attached drawings.

DESCRIPTION OF THE EMBODIMENTS

First Embodiment

Figure 1:
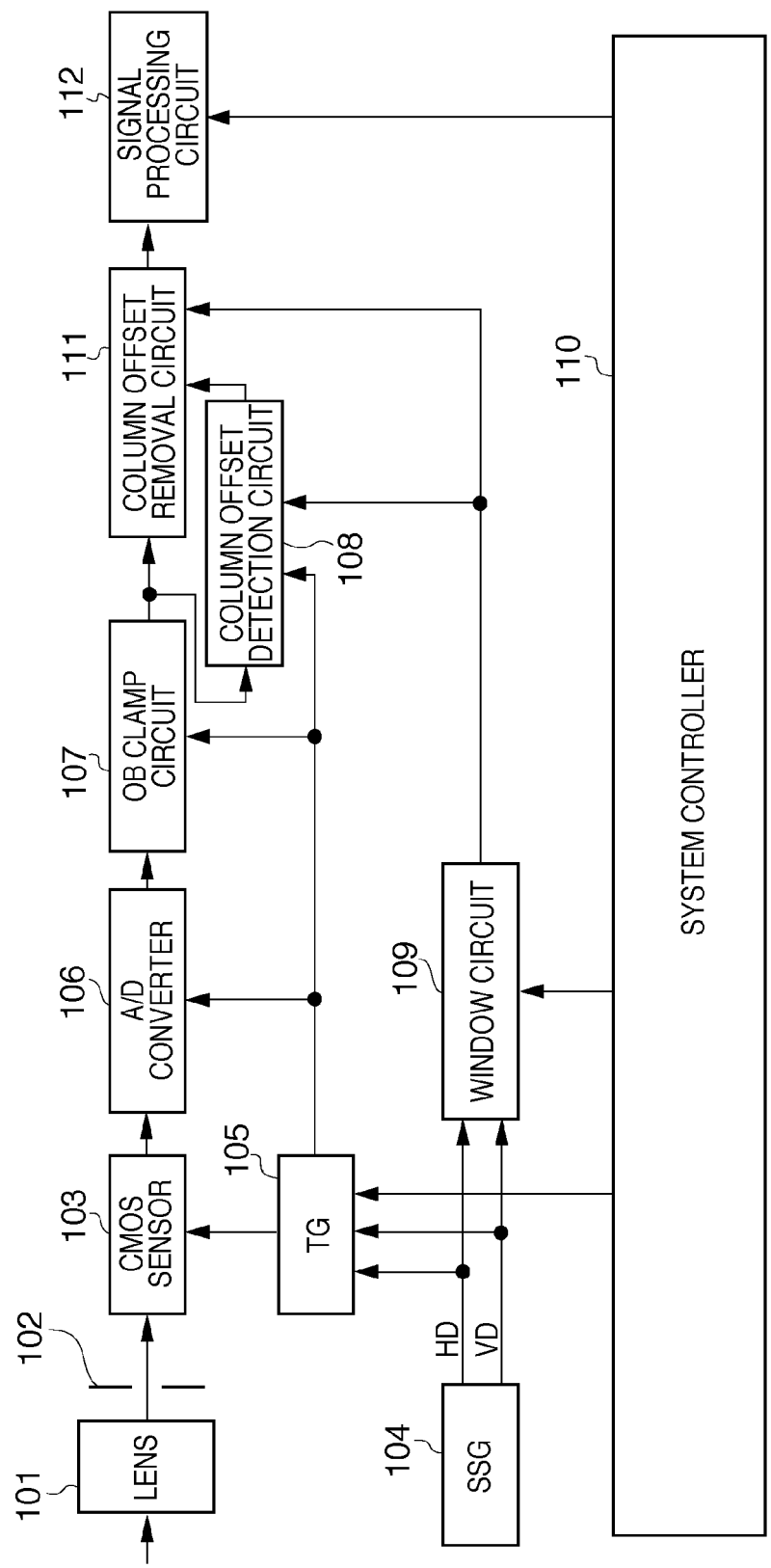
FIG. 1 is a block diagram showing the overall arrangement of an image capture apparatus.
Figure 2:
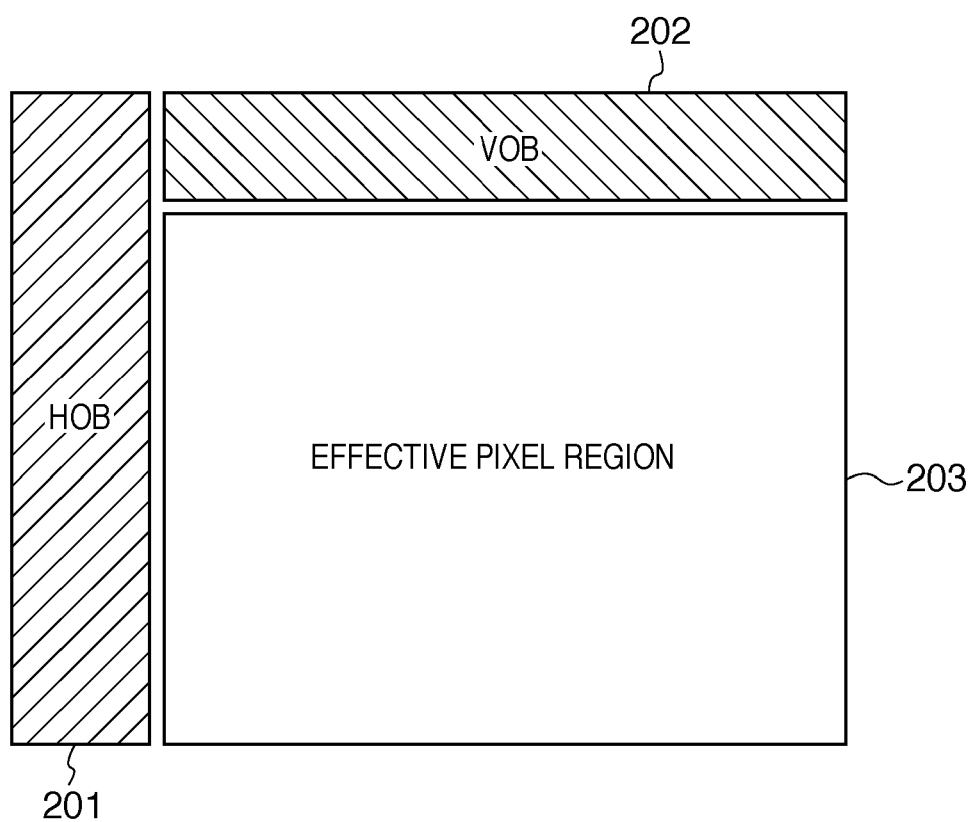
FIG. 2 is a region explanatory view of pixel arrays of a sensor.

FIG. 1 is a block diagram showing the overall arrangement of an image capture apparatus (image processing apparatus) according to the first embodiment of the present invention. FIG. 2 is a view illustrating a pixel matrix in which pixels in a CMOS sensor as an image sensor are arranged in matrix.

As shown in FIG. 1, the image capture apparatus (image processing apparatus) includes a lens 101, stop 102, and CMOS sensor 103 used to convert light into an electrical signal. As shown in FIG. 2, the CMOS sensor 103 includes an effective pixel region 203 in which photodiodes as photoelectric conversion elements are irradiated with light, and a horizontal optical black (to be abbreviated as "HOB" hereinafter) region 201 in which light irradiation is intercepted over several to several ten columns by, for example, an aluminum thin film. Furthermore, the CMOS sensor 103 includes a vertical optical black (to be abbreviated as "VOB" hereinafter) region 202 in which light irradiation is intercepted over several to several ten lines by, for example, an aluminum thin film.

A sync signal generator (to be abbreviated as "SSG" hereinafter) 104 generates a horizontal sync signal (to be referred to as an HD signal hereinafter) and a vertical sync signal (to be referred to as a VD signal hereinafter). A timing generator (to be abbreviated as "TG" hereinafter) 105 generates various control signals required to drive the CMOS sensor 103 in synchronism with the HD signal and VD signal. An A/D converter 106 converts an analog image signal into a digital image signal. An OB clamp circuit 107 clamps an output value of the A/D converter 106 during an OB period to a predetermined value. A column offset detection circuit 108 extracts column offset components included in image data output from the OB clamp circuit 107 from image data in a vertical OB (to be abbreviated as "VOB" hereinafter) pixel region. A column offset removal circuit 111 subtracts the column offsets detected by the column offset detection circuit 108 from image data in the effective pixel region. A window circuit 109 generates control signals required to drive the column offset detection circuit 108 and column offset removal circuit 111. A system controller 110 decides an operation mode and parameters by controlling respective circuits. A signal processing circuit 112 converts image data into that which can be displayed on a display device or converts the image data into a JPEG image in correspondence with a recording device, by executing interpolation processing and color conversion processing, and variable magnification processing such as reduction and enlargement to the image data.

Figure 3:
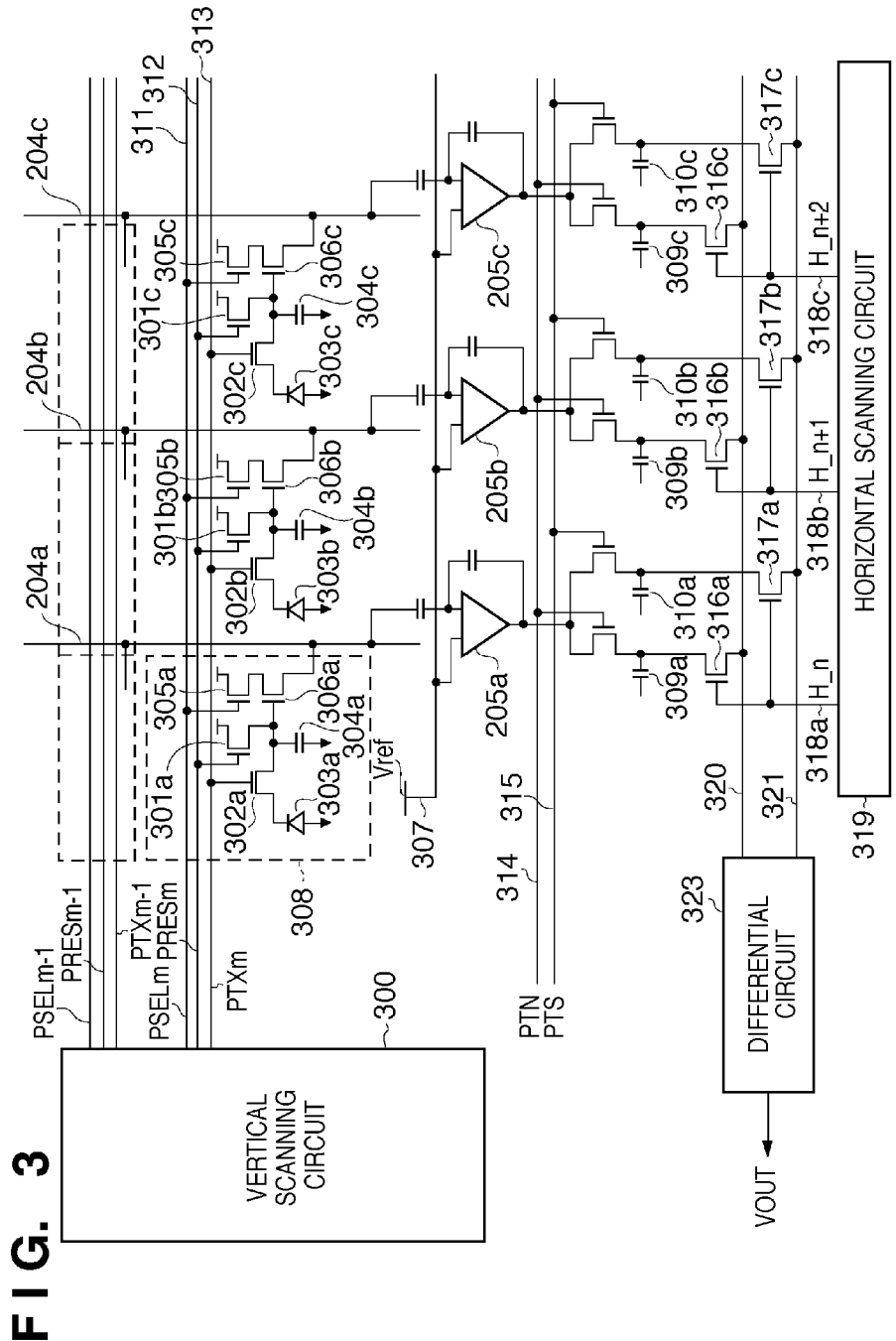
FIG. 3 is a circuit diagram showing the internal arrangement of the sensor.

FIG. 3 is a circuit diagram showing an example of the internal arrangement of the CMOS sensor 103 in more detail. Referring to FIG. 3, a vertical scanning circuit 300 selects a specific read-out row from the pixel matrix, and reset transistors (to be referred to as reset Tr hereinafter) 301a to 301c reset light signal charges accumulated on photodiodes (to be referred to as PD hereinafter) 303a to 303c. Transfer transistors (to be referred to as transfer Tr hereinafter) 302a to 302c transfer light signal charges accumulated on the PD 303a to PD 303c to floating diffusions (to be referred to as FD hereinafter) 304a to 304c, and the PD 303a to PD 303c are photoelectric conversion elements. The FD 304a to FD 304c convert the light signal charges into FD potentials. Selection transistors (to be referred to as selection Tr hereinafter) 305a to 305c select specific rows to enable pixel source-followers (to be referred to as pixel SF) 306a to 306c to read out the FD potential on vertical output lines 204a to 204c. The pixel SF 306a to pixel SF 306c are buffer amplifiers used to read out the FD potentials onto the vertical output lines 204a to 204c.

A broken line frame 308 indicates a configuration unit of a read-out circuit for one pixel. A reference voltage Vref 307 is used as a reference for signal amplification in column amplifiers 205a to 205c, and sample-hold circuits (to be referred to as S/H(N) hereinafter) 309a to 309c store N signals (noise signals). Sample-hold circuits (to be referred to as S/H(S) hereinafter) 310a to 310c store S signals (light signal components). Signal lines used to control the solid-state image sensor include a row selection line 311 of the m-th row (to be referred to as PSEL_m hereinafter), a reset signal line 312 of the m-th row (to be referred to as PRES_m hereinafter), and a signal transfer line 313 of the m-th row (to be referred to as PTX_m hereinafter). A PTN 314 is a signal used to decide a read-out period to the S/H(N) 309, and a PTS 315 is a signal used to decide a read-out period to the S/H(S) 310.

Transistors 316a to 316c are required to selectively read out the outputs from the S/H(N) 309 of the respective columns onto a horizontal output line 320. Likewise, transistors 317a to 317c are required to selectively read out the outputs from the S/H(S) 310 of the respective columns onto a horizontal output line 321. A horizontal scanning circuit 319 selects a specific read-out column from the outputs of the S/H(N) 309 and S/H(S) 310 of the respective columns, and outputs selection signals Hn to Hn+2 318a to 318c of the n-th to (n+2)-th columns. A differential circuit 323 receives signals from the horizontal output lines 320 to 321, and differentially outputs an output VOUT of the CMOS sensor 103.

Note that the arrangement having four transistors in the configuration unit for one pixel has been exemplified. Alternatively, when a method of using two or more types of reset voltages, and inactivating/activating the pixel SF is used, the selection Tr 305 can be deleted. A structure in which a plurality of PD share the FD and SF may be used.

Figure 4:
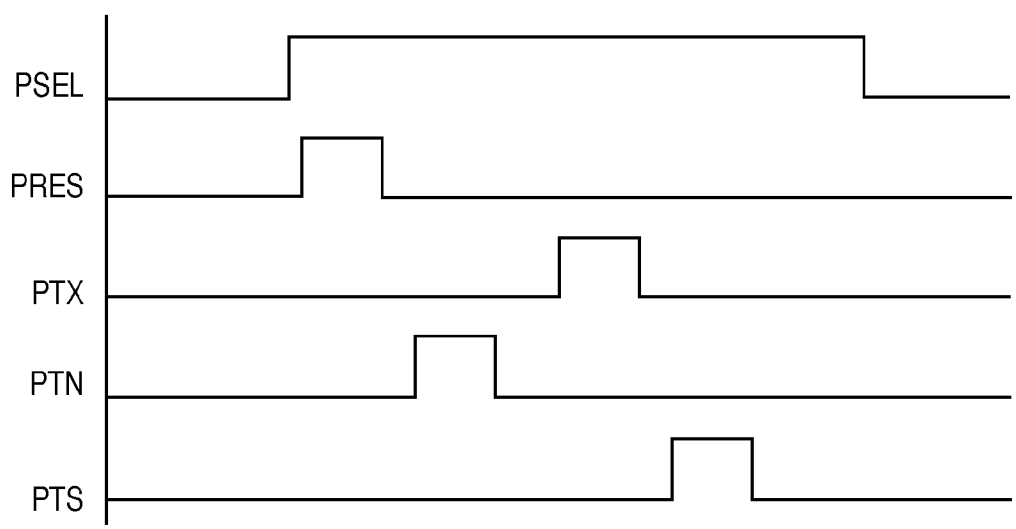
FIG. 4 is a chart showing read-out timings of the sensor.

Timing operations of principal control signal lines described in FIG. 3 will be described below with reference to FIG. 4. When an image capture operation is started and the PD 303 is irradiated with light, a light signal charge is generated, and the PD 303 starts accumulation. The vertical scanning circuit 300 sequentially scans respective rows. When the scan reaches the m-th row, the PRES_m 312 goes to high level, and the signal of the FD 304 is reset. Next, the PSEL_m 311 goes to high level, and a reset level including reset noise is read out onto the vertical output line 204 via the pixel SF 306. A difference between the reset level read out onto the vertical output line 204 and the reference voltage Vref 307 is amplified and output by the column amplifier 205. Then, the output N signal is stored in the S/H(N) 309 during a high-level period of the PTN 314 (to be referred to as an N read period hereinafter). After that, the PTX_m 313 goes to high level to read out the charge generated by the PD 303 to the FD 304. As in the N signal, an S signal output via the pixel SF 306, vertical output line 204, and column amplifier 205 is stored in the S/H(S) 310 during a high-level period of the PTS 315 (to be referred to as an S read period hereinafter).

The N signals of the m-th row of the respective columns, which are read out and stored in the S/H(N) 309 in this way, are sequentially read out onto the horizontal output line 320 for each column via the selection transistor 316 controlled by the output signal 318 of the horizontal scanning circuit 319. Likewise, the S signals of the m-th row of the respective columns, which are read out and stored in the S/H(S) 310, are sequentially read out onto the horizontal output line 321 for each column via the selection transistor 317 controlled by the output signal 318 of the horizontal scanning circuit 319. The N and S signals of the m-th row, which are parallelly read out for each column, are input to the differential circuit 323 as differential signals, and their differential output is used as the sensor output VOUT of the CMOS sensor 103.

The S signal is obtained by adding a signal based on a light signal charge generated by the PD to the N signal. In this way, by performing a differential operation between the S and N signals, a CDS operation is attained. Then, reset noise and 1/f noise caused by the image sensor are removed from the sensor output VOUT of the CMOS sensor 103, and an image capture signal is output in a state in which pixel defect noise and RTS noise are superposed in addition to column offsets.

Figure 5:
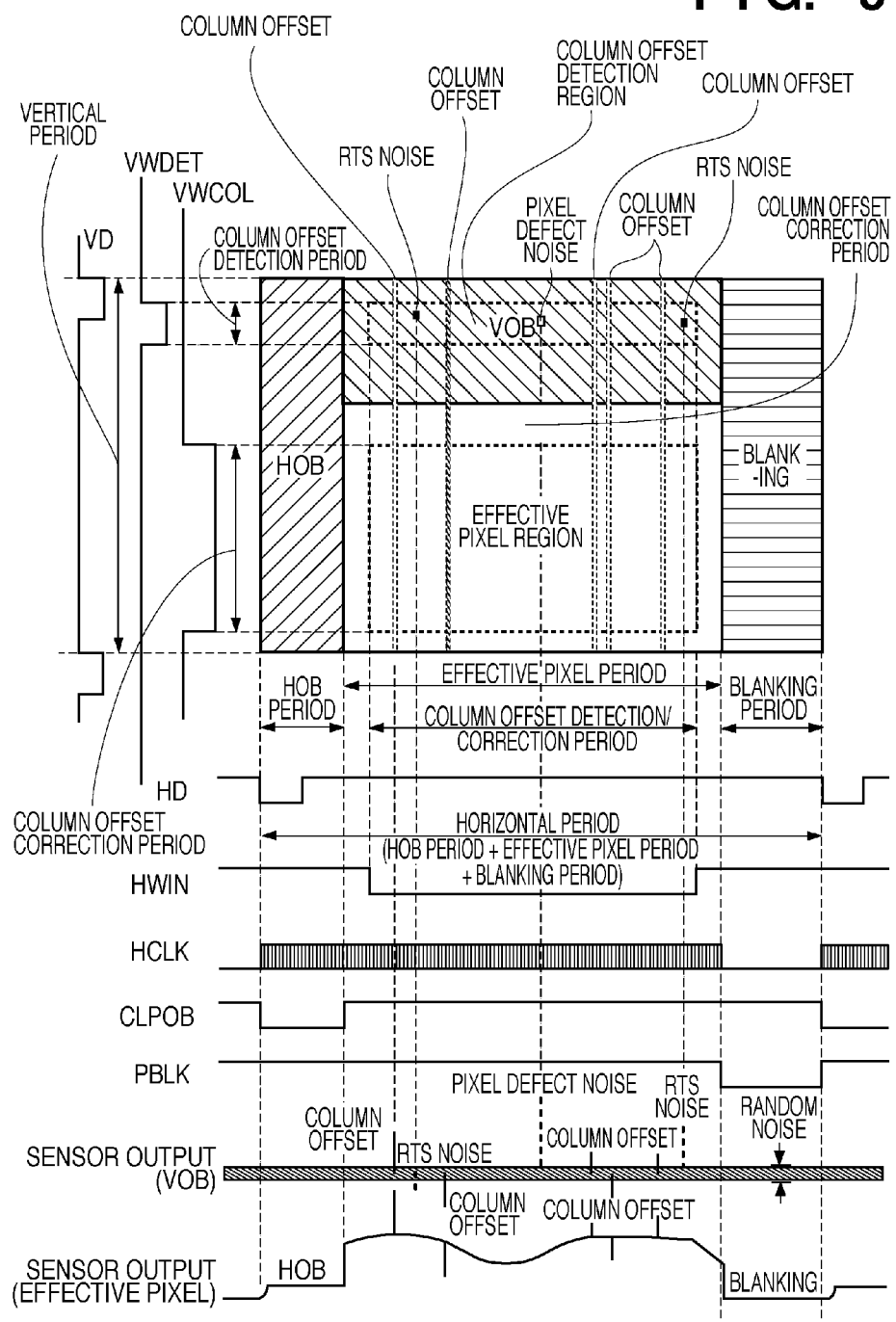
FIG. 5 is a timing chart of principal signals.

The operation of the image capture apparatus of this embodiment with the overall arrangement shown in FIG. 1 will be described below. FIG. 5 is an explanatory timing chart showing states of timing signals of the respective principal units in the operation of the image capture apparatus, and sensor outputs, which are output in synchronism with these timing signals.

The TG 105 generates various control signals required to drive the CMOS sensor 103 from the HD signal and VD signal generated by the SSG 104. The CMOS sensor 103 converts a light signal passed through the lens 101 and stop 102 into an electrical signal at the timing of a control signal generated by the TG 105. An analog image signal read out from the CMOS sensor 103 is converted by the A/D converter 106 from an analog signal into digital image data, the OB period of which is clamped to a predetermined level via the OB clamp circuit 107. After that, the image data is output to the column offset detection circuit 108 and column offset removal circuit 111.

The window circuit 109 supplies, to the column offset detection circuit 108, a vertical detection window signal (VWDET) which designates a vertical detection period (vertical detection region) of column offsets in the VOB region and a horizontal detection window signal (HWIN) which designates a horizontal detection period (horizontal detection region), with reference to the HD signal and VD signal. Also, the window circuit 109 supplies a counter pulse signal (CCLK) used to count the number of times of cyclic calculations. The window circuit 109 supplies, to the column offset removal circuit 111, a vertical correction period signal (VWCOL) which designates a vertical column offset correction period in the effective pixel region, and a horizontal correction period signal (HWIN) which designates a horizontal column offset correction period. Note that the signal HWIN supplied as the horizontal correction period signal is the same as the horizontal detection window signal. The column offset detection circuit 108 calculates column offset data according to the vertical and horizontal detection window signals (VWDET and HWIN) supplied from the window circuit 109. The column offset removal circuit 111 removes column offsets by subtracting the column offset data from an effective pixel signal in accordance with the vertical and horizontal correction period signals (VWCOL and HWIN) supplied from the window circuit 109. The image data output from the column offset removal circuit 111 undergoes signal processing by the signal processing circuit 112 to be converted into image data which is suited to a display device and recording device.

The TG 105 supplies a clock signal (HCLK signal) used to read out a signal for each pixel from the CMOS sensor 103 to the CMOS sensor 103 in addition to the HD signal and VD signal as sync signals. The HCLK signal is a read-out control signal, which controls a sensor output for a 1-pixel cycle unit so as to read pixel signals of the HOB, VOB, and effective pixel regions as the internal elements of the CMOS sensor 103, and stops a sensor output during a read-out prohibition period. Furthermore, the TG 105 supplies, to the OB clamp circuit 107, a control signal (CLPOB signal) used to extract a pixel signal, which serves as a black reference of a sensor output, from the VOB and HOB regions. Since the OB clamp circuit 107 subtracts HOB and VOB pixel signals from a signal of the effective pixel region, a stable sensor output free from any black level variation can be obtained. A timing of a PBLK signal indicates a blanking period (Tblk) in which a read-out operation of a sensor output is stopped in one horizontal period.

The CMOS sensor 103 readily generates column offsets of pixel signal values due to variations of element characteristics which are different for respective columns at the time of read-out operations, owing to the X-Y address type read-out structure. For this reason, column offsets are equally generated on identical columns having common read-out routes of the VOB, HOB, and effective pixel regions. On the output from the CMOS sensor, pixel defect noise and RTS noise are superposed in addition to column offsets, and random noise such as quantization noise caused by an analog circuit and A/D conversion in the sensor latter stage is further superposed. The waveforms of a sensor output (VOB) and sensor output (effective pixel region) in FIG. 5 illustrate states of column offsets and other noise components superposed on these sensor outputs.

Figure 6:
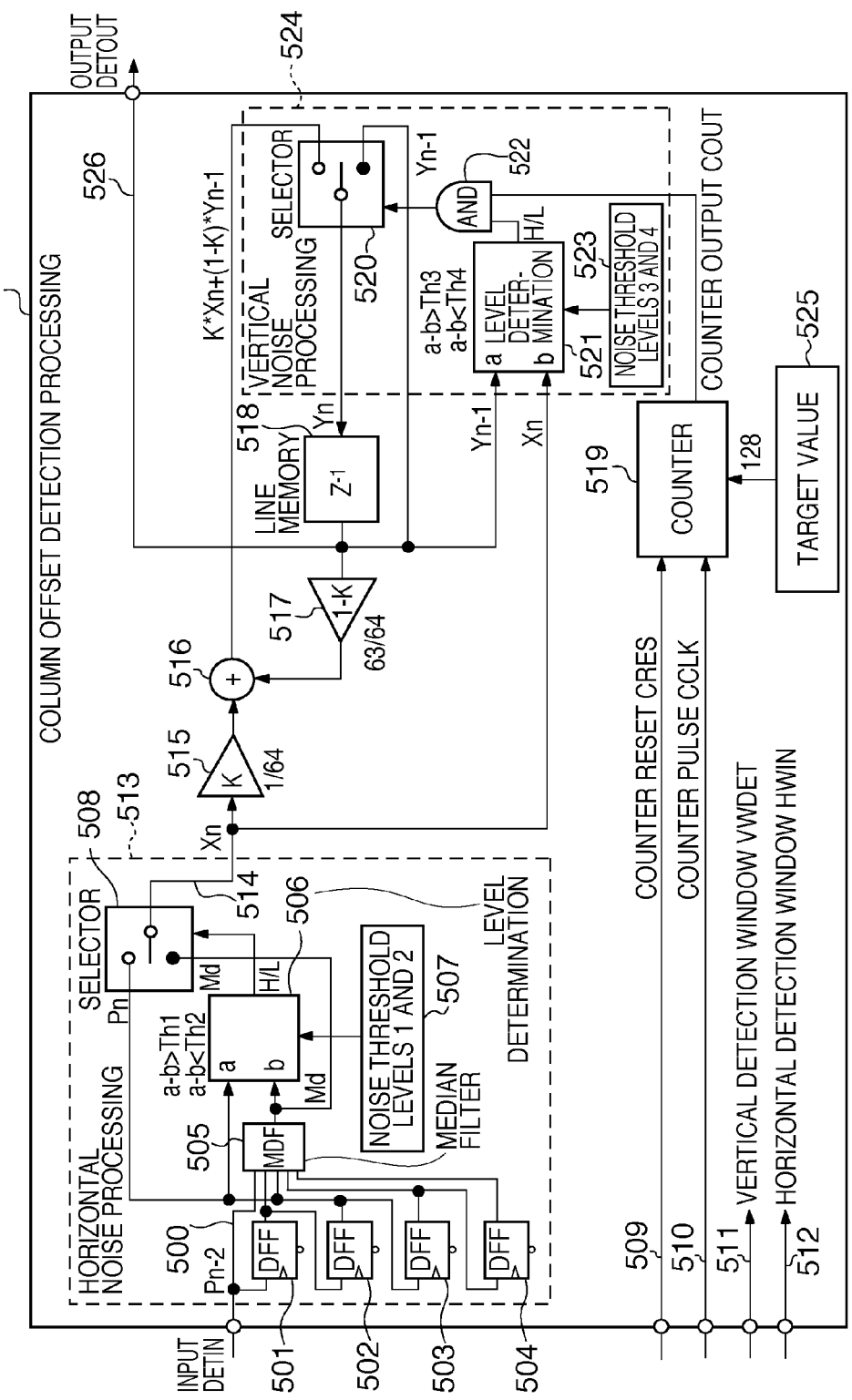
FIG. 6 is a circuit diagram showing a column offset detection circuit according to the first embodiment.

The gist of this embodiment is to detect column offsets alone with high precision by removing unwanted noise components from the sensor output of the VOB region in the state in which column offsets and other noise components are superposed. FIG. 6 is a detailed circuit diagram of the column offset detection circuit 108 which implements it.

The arrangement shown in FIG. 6 will be described first. An input signal 500 is input to the column offset detection circuit 108. Outputs of D-flip-flops (to be abbreviated as DFF hereinafter) 501, 502, 503, and 504 are connected in series to configure a 4-stage shift register driven by pixel clocks. The DFF 501 corresponds to the first stage, the DFF 502 corresponds to the second stage, the DFF 503 corresponds to the third stage, and the DFF 504 corresponds to the fourth stage. A median filter 505 is a 5-input median filter, and receives the image capture input signal 500 and the outputs from the DFF 501 to DFF 504. The output of the DFF 502 is connected to a positive input a of a difference level determination circuit 506 of two input signals, and the median output of the median filter 505 is connected to a negative input b of the difference level determination circuit 506.

In a register 507, threshold levels Th1 and Th2 (first and second threshold levels) used to decide a predetermined level range are set. The threshold levels Th1 and Th2 are used as determination reference values of the difference level determination circuit 506. A determination output (H/L) of the difference level determination circuit 506 is connected to a switching control terminal of a selector 508. The output of the DFF 502 and that of the median filter 505 are connected to the inputs of the selector 508. The DFF 501 to DFF 504, median filter 505, difference level determination circuit 506, register 507, and selector 508 in a broken line frame configure a horizontal noise processing circuit 513 (noise removal unit).

An output 514 of the selector 508 is input to a multiplier (coefficient K) 515 as an output signal of the horizontal noise processing circuit 513, and also to a negative input b of a difference level determination circuit 521. The output of the multiplier (coefficient K) 515 and that of a multiplier 517 (coefficient 1−K) are input to an adder 516, and are added to each other. The output from the adder 516 is input to one input terminal of a selector 520, and the output from the selector 520 is input to a line memory 518.

The output from the line memory 518 is input to the multiplier 517, and also to the other input terminal of the selector 520 and a positive input a of the difference level determination circuit 521.

Furthermore, the output from the line memory 518 is used as a detection output 526 of the column offset detection circuit 108.

In a register 523, threshold levels Th3 and Th4 (third and fourth threshold levels) used to decide a predetermined level range are set. The threshold levels Th3 and Th4 are used as determination reference values of the difference level determination circuit 521. A determination output (H/L) of the difference level determination circuit 521 is input to one input terminal of an AND gate 522. To the other input terminal of the AND gate 522, a carry output COUT of a counter 519 is connected, and an AND gate output of these inputs is connected to a switching control terminal of the selector 520. The selector 520, difference level determination circuit 521, AND gate 522, and register 523 in a broken line frame configures a vertical noise processing circuit 524.

In a register 525, a counter setting value (target value) is set, and is used as a reference value of the carry output (COUT) of the counter 519. To the counter 519, a counter reset signal (CRES) used to reset the counter to zero, and counter pulses (CCLK) used to count the counter are supplied from the TG 105. Details of the operation of FIG. 6 will be described below. The image capture signal 500 input to the column offset detection circuit 108 is input to the horizontal noise processing circuit 513 first, and undergoes noise removal processing based on level determination between horizontal data.

Figure 7:
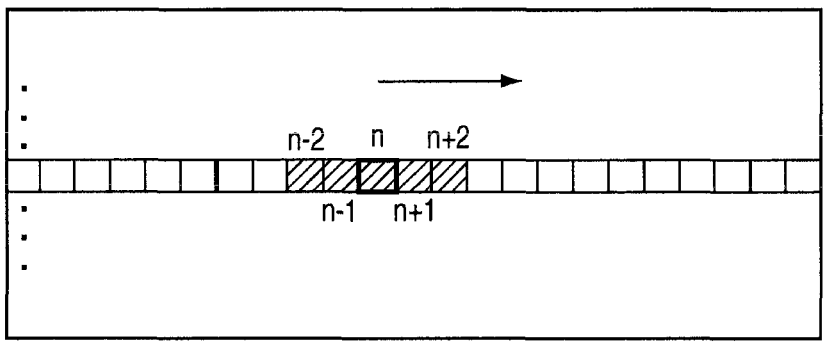
FIG. 7 is an operation explanatory view of a horizontal noise processing circuit.
Figure 7:
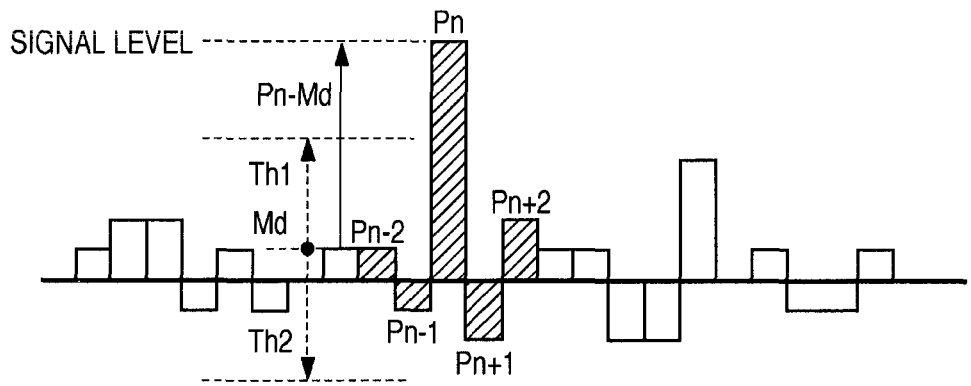

FIG. 7 is a view for explaining a horizontal noise processing algorithm. The shift register including the DFF 501 to DFF 504 parallelly extracts data ($P_{n-2}$, $P_{n-1}$, $P_n$, $P_{n+1}$, and $P_{n+2}$) for five pixels on the same row in the horizontal direction, and applies the median filter 505 to these data. The median filter 505 ranks the five input data, and outputs a median Md to the difference level determination circuit 506. The difference level determination circuit 506 calculates difference data ($P_n$−Md) between the pixel data $P_n$ and the median Md of a total of five pixel data including this pixel data $P_n$ and right and left two neighboring pixels, and compares a level of the calculated difference data ($P_n$−Md) with the range defined by the threshold levels Th1 and Th2. When the level of the difference data exceeds the range defined by the threshold levels Th1 and Th2, the output of the difference level determination circuit 506 goes to High level, and the selector 508 selects the median Md. That is, the pixel data Pn is excluded as noise. When the level of the difference data falls within the range defined by the threshold levels Th1 and Th2, the output of the difference level determination circuit 506 goes to Low level, and the selector 508 selects the pixel data $P_n$. The horizontal noise processing circuit 513 sequentially executes these operations for respective horizontal pixels within a column offset detection period (detection region) specified by the vertical detection window signal (VWDET) and horizontal detection window signal (HWIN).

By narrowing down the setting range defined by the threshold levels Th1 and Th2, noise of a smaller level can be removed accordingly. However, horizontal data include variation components due to column offsets, and a maximum value of assumed column offsets is desirably set as a lower limit of the setting range defined by the threshold levels Th1 and Th2, so as not to exclude column offsets as noise.

The output 514 ($X_n$) after the horizontal noise processing is input to a cyclic integral circuit configured by the multiplier 515, adder 516, multiplier 517, and line memory 518 to make a cyclic calculation between vertical data (between signals), as described by:

$$Y_n \leftarrow K \cdot X_n + (1-K) \cdot Y_{n-1} \qquad (1)$$

where K: a cyclic coefficient
In the line memory 518, a cyclic calculation value ($Y_n$) is sequentially updated.

The line memory 518 can hold pixel data for one horizontal data indicated by the horizontal detection window signal (HWIN). The cyclic integral circuit sequentially executes these operations for respective horizontal pixels in a column offset detection period (detection region) specified by the vertical detection window signal (VWDET) and horizontal detection window signal (HWIN). A cyclic calculation value held in the line memory 518 after a plurality of times of cyclic calculations within the vertical detection window signal (VWDET) is used as detected column offset data. The column offset data is read out to the column offset removal circuit 111 within the vertical correction period signal (VWCOL) to remove column offsets.

Figure 8:
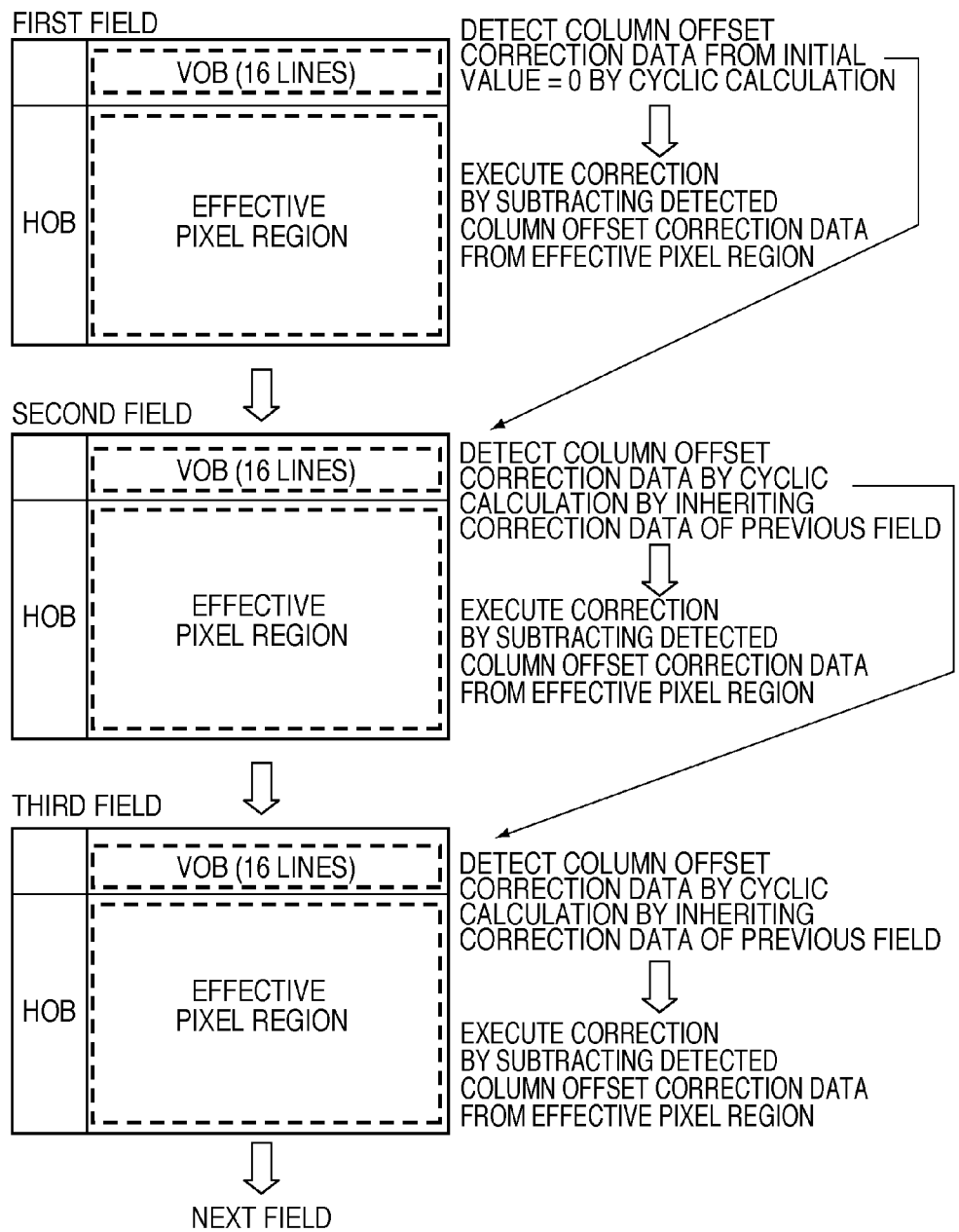
FIG. 8 is an explanatory view of column offset detection and correction operations.

FIG. 8 is a view showing the sequence executed when column offsets are detected from successively readout images and are corrected upon capturing a moving image. Initially, a column offset is detected from a VOB region of the first field to have an initial value=0 of a cyclic calculation, and the detection result is subtracted from pixel data of an effective pixel region, thus removing the column offset from an image of the effective pixel region.

In the next second field, the column offset data of the first field is inherited as a previous cyclic calculation value (a calculation result of the cyclic calculation) to detect a column offset from a VOB region of the second field. Then, the detected column offset is subtracted from pixel data of an effective pixel region. Thus, the column offset is removed from an image of the effective pixel region.

In the next third field, the column offset data of the second field is further inherited as the cyclic calculation value to detect a column offset from a VOB region of the third field. Then, the detected column offset is subtracted from pixel data of an effective pixel region. Thus, the column offset is removed from an image of the effective pixel region. This processing is sequentially repeated in subsequent fields. In the aforementioned processing stages, the cyclic calculation value is gradually converged from the initial value=0 to an original column offset.

Figure 9:
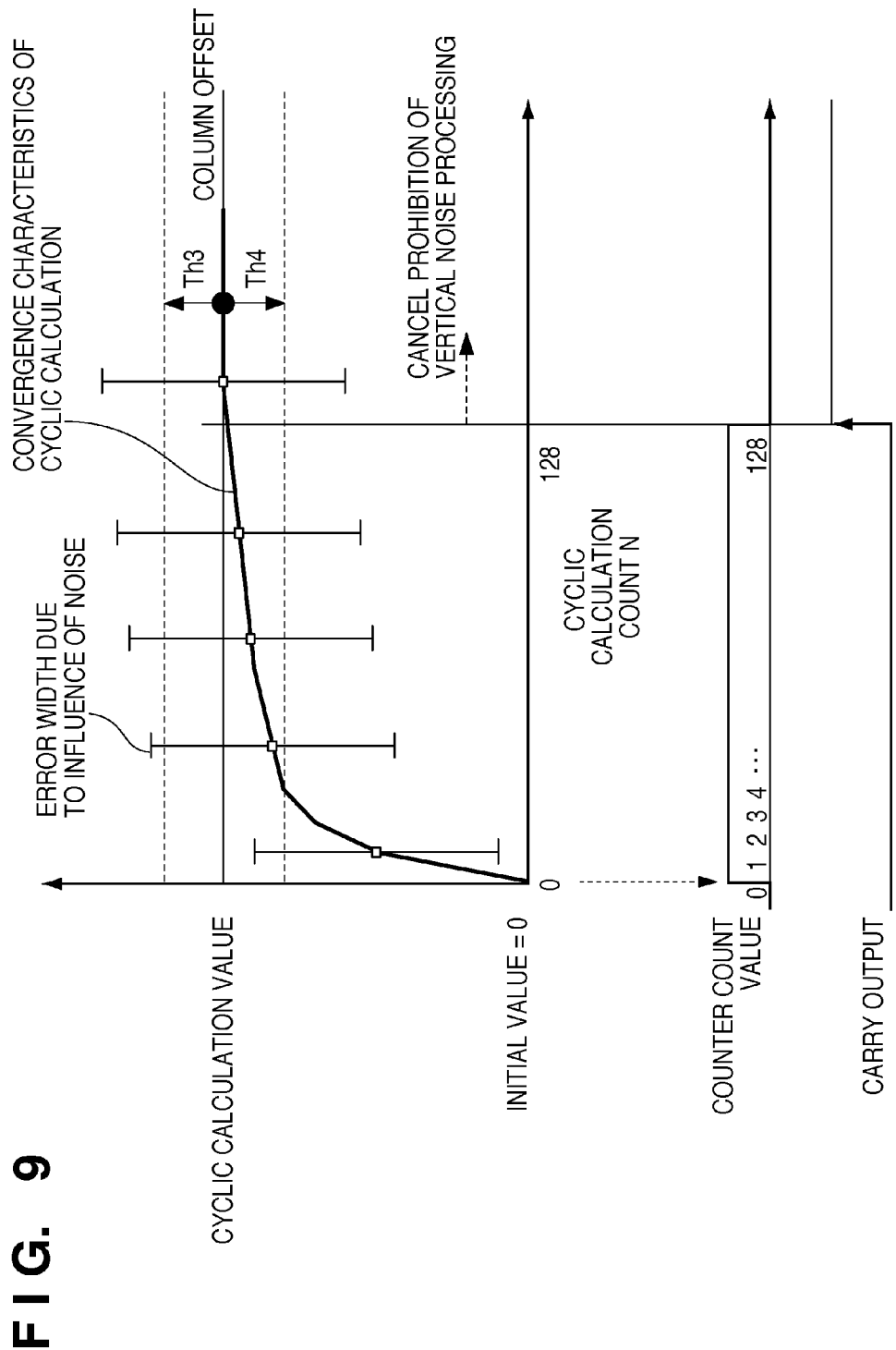
FIG. 9 is an operation explanatory view of vertical noise processing according to the first embodiment.

FIG. 9 is a view showing a convergence state of the cyclic calculation value. In case of the cyclic calculation formula given by equation (1), for example, if the cyclic coefficient K=(1/64), (1/64) of the input data $X_n$ is weighted-averaged as a cyclic calculation value in a single cyclic calculation. For this reason, when this calculation is repeated 128 times, the cyclic calculation value can be nearly converged. In the example of FIG. 8, since the number of detection lines in the VOB region per field is set to be 16, and 16 cyclic calculations can be made per field, the cyclic calculations are converged in the first eight fields to detect a correct column offset. However, in practice, pixel defect noise and RTS noise are superposed on the output signal of the VOB region as the column offset detection region, and errors are generated in the cyclic calculation value under the influence of these noise components.

The pixel defect noise and RTS noise having levels larger than the maximum value of the assumed column offsets can be removed by the horizontal noise processing arranged in the previous stage of the cyclic calculation circuit. Therefore, an error width of the cyclic calculation value is decided based on the maximum value of the assumed column offsets. However, as the maximum value of the assumed column offsets, about several mV to several 10 mV as the output of the image sensor are estimated, and a product of that value by the cyclic coefficient K is used as an approximate error width of the cyclic calculation value. In order to reduce the error width due to the influence of noise, a smaller cyclic coefficient K may be set. However, when the smaller cyclic coefficient K is set, the convergence time of the cyclic calculation value is prolonged in proportion to that coefficient value. The cyclic coefficient K that suffices an allowable convergence time is about 1/64 in the present circumstances, and the error width of the cyclic calculation value at that time may cause generation of vertical stripe noise especially at a high gain.

Hence, in the vertical noise processing circuit 524, when the carry output (COUT) of the counter 519 is at High level, the difference level determination circuit 521 calculates difference data $((Y_{n-1})-X_n)$ between the input data $(X_n)$ to the cyclic integral circuit and output data $(Y_{n-1})$ of the line memory 518 as the immediately preceding cyclic calculation value, and compares a level of the calculated difference data $((Y_{n-1})-X_n)$ with a range defined by the threshold levels Th3 and Th4. When the level of the difference data exceeds the range defined by the threshold levels Th3 and Th4, the output of the difference level determination circuit 521 goes to High level, and the selector 520 selects the immediately preceding cyclic calculation value $(Y_{n-1})$ in place of a normal cyclic calculation value.

Upon vertical noise determination:

$$Y_n \leftarrow Y_{n-1} \qquad (2)$$

That is, the input data $X_n$ is excluded as noise. When the level of the difference data falls within the range defined by the threshold levels Th3 and Th4, the output of the difference level determination circuit 521 goes to Low level, and the selector 520 selects the cyclic calculation value using the input data $X_n$ (the calculation value of equation (1)). The difference data $((Y_{n-1})-X_n)$ on the same column basically does not include any column offset. Therefore, unlike the horizontal noise processing circuit 513, the vertical noise processing circuit 524 can set the noise removal range set based on the threshold levels Th3 and Th4 to be a smaller value without being restricted by the maximum value of the assumed column offsets.

The function of the counter 519 will be described below. The noise removal operation of the vertical noise processing circuit 524 is to substitute the normal cyclic calculation value by the immediately preceding cyclic calculation value $(Y_{n-1})$, and is equivalent to a halt operation of the cyclic calculation. Therefore, when the vertical noise processing is executed in a region with a large variation at the time of convergence of the cyclic calculations, the variation at the time of convergence may be determined as noise, and the cyclic calculations are unlikely to be converged. For this reason, the counter 519 performs timing adjustment required to execute the vertical noise processing by limiting to a region with a small variation at the time of convergence after the beginning of the cyclic calculation (detection operation) (by setting a region with a large variation at the time of convergence as a stop period of the vertical noise processing).

As exemplified in FIG. 9, when the cyclic coefficient is (1/64), the output of the difference level determination circuit 521 is gated by the carry output (COUT) of the counter 519, so as to permit execution of the vertical noise processing operation after the cyclic calculation count exceeds 128 times.

Figure 10:
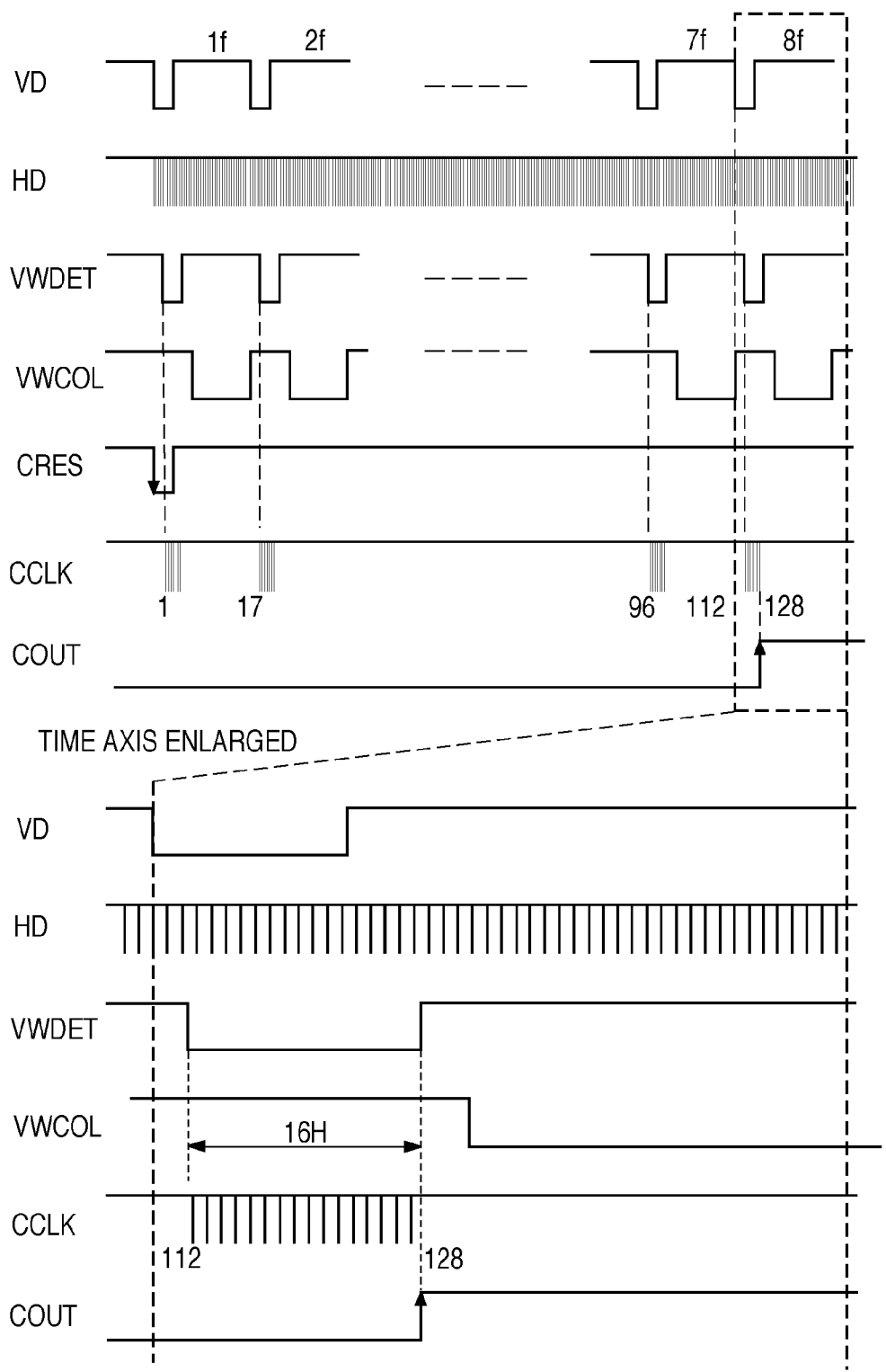
FIG. 10 is a timing chart of signals of the vertical noise processing.

FIG. 10 shows the timings of the counter reset signal (CRES), counter pulses (CCLK) used to count the counter, and carry output (COUT), which are supplied to the counter 519. In the counter 519, a counter setting value (target value)=128 of the register 525 is set. The counter value is reset to zero in response to the trailing edge of the counter reset signal (CRES), and the carry output (COUT) is cleared to Low level.

During a High-level period of the vertical detection window signal (VWDET), pulses synchronized with the horizontal sync signal HD are supplied to count the counter value in response to the trailing edges of the pulses. When the counter count value reaches a counter reference value (128), the carry output (COUT) is switched to High level.

Second Embodiment

The vertical noise processing described in the first embodiment executes noise detection focusing attention on a change amount at the time of cyclic calculations. Therefore, this vertical noise processing cannot be used in a region with a large variation at the time of convergence of cyclic calculations. In order to avoid this, the vertical noise processing is prohibited for a predetermined calculation count from the start timing of the cyclic calculations in the first embodiment.

By contrast, a level that a column offset can assume, that is, a cyclic calculation value after convergence is limited within a predetermined range assumed based on the characteristics of an image sensor. Hence, in the second embodiment, a prohibition period of the vertical noise processing is set focusing attention on an absolute level of a cyclic calculation value.

Figure 11:
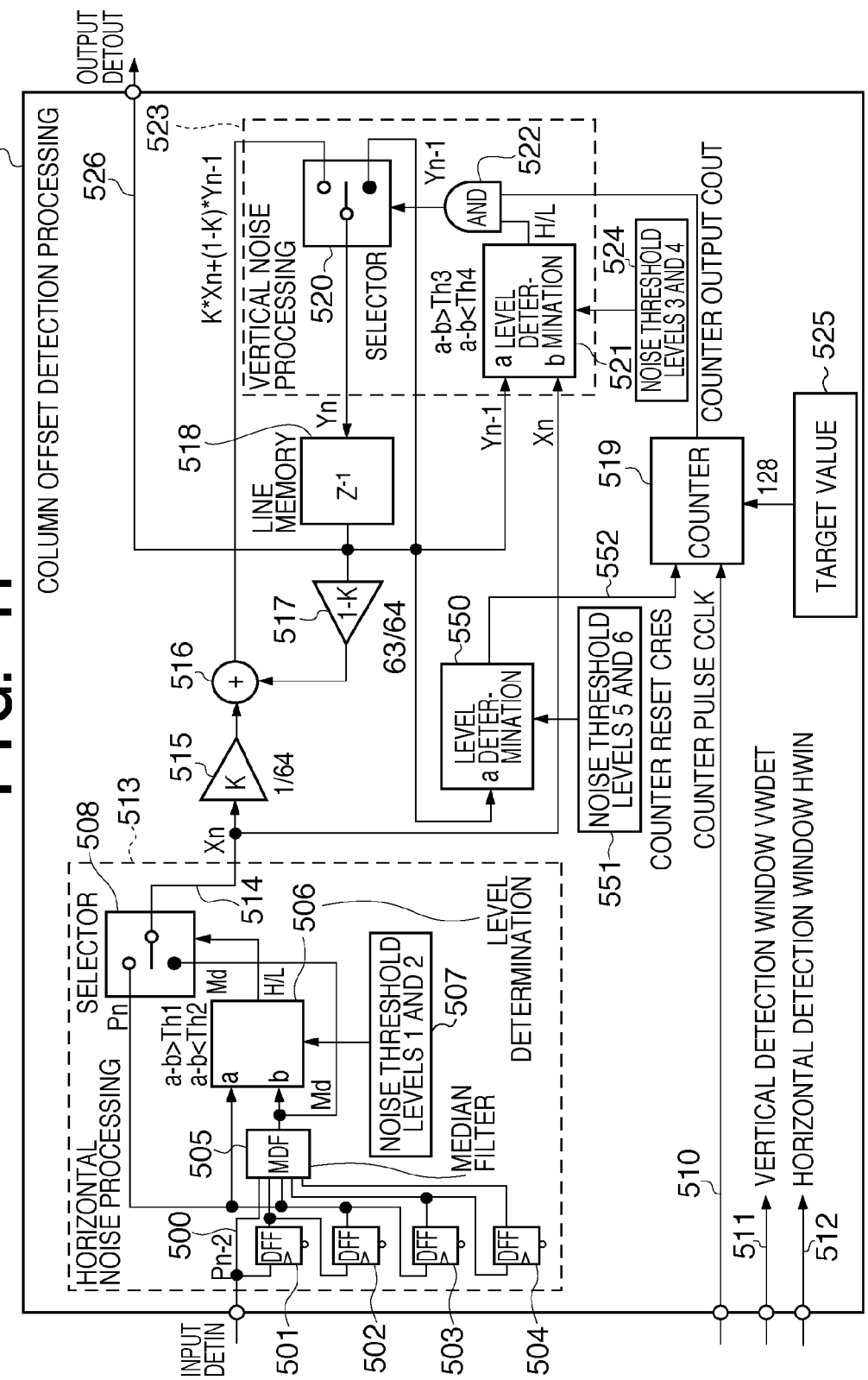
FIG. 11 is a circuit diagram showing a column offset detection circuit according to the second embodiment.

FIG. 11 is a detailed circuit diagram of a column offset detection circuit 108 for this purpose. Differences from the circuit diagram in FIG. 6 described in the first embodiment are a small number of components around a counter 519, and the arrangement and operation of only the different components will be described below.

As a new component, a level determination circuit 550 is added, and the output of the level determination circuit 550 is connected as a counter reset signal (CRES) of the counter 519 unlike in the first embodiment. The level determination circuit 550 receives output data $(Y_{n-1})$ of a line memory 518. In a register 551, threshold levels Th5 and Th6 used to decide a predetermined level range are set. The threshold levels Th5 and Th6 (fifth and sixth threshold levels) are used as determination reference values of the level determination circuit 550.

Figure 12:
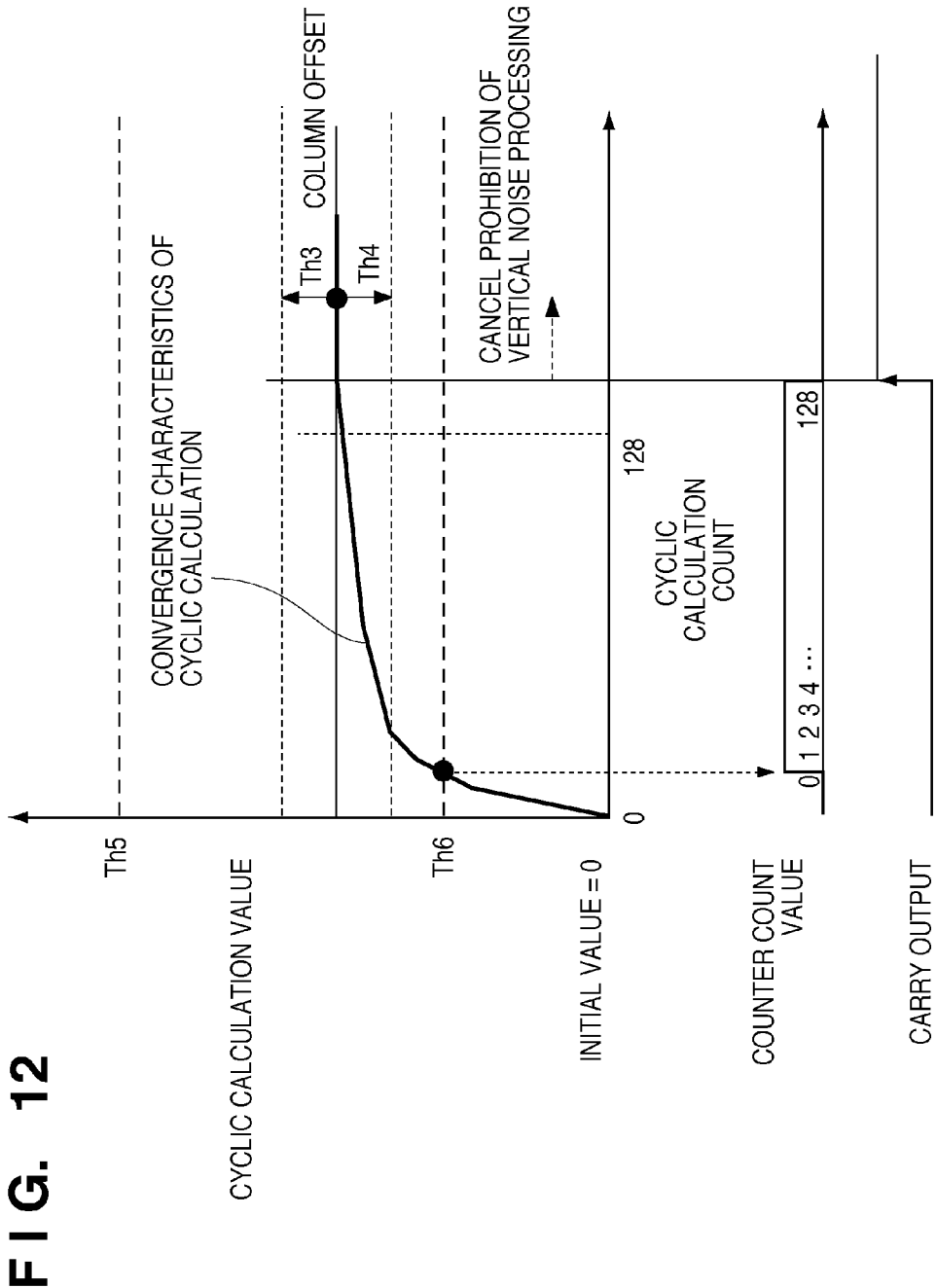
FIG. 12 is an operation explanatory view of vertical noise processing according to the second embodiment.
Figure 13:
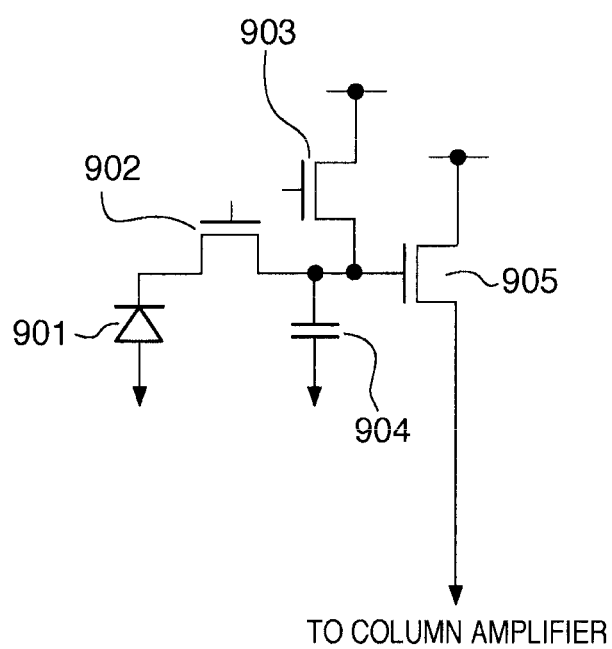
FIG. 13 is a noise explanatory view of an image sensor.

FIG. 12 is a view showing the convergence state of cyclic calculation values and the state of the counter 519. The operation of the counter 519 will be described below with reference to FIGS. 11 and 12. When a cyclic coefficient K is 1/64, a cyclic calculation value starts a cyclic calculation from an initial value=0, and exhibits the same convergence characteristics as in the first embodiment during 128 cyclic calculations. In the register 551, a range that a maximum value of assumed column offsets (detection values) can assume is set using the threshold levels Th5 and Th6. When the output data $(Y_{n-1})$ of the line memory 518 falls within this range after the beginning of the cyclic calculation, the output of the level determination circuit 550 is switched from High level to Low level.

Since the output of the level determination circuit 550 is connected to the counter 519 as the counter reset signal (CRES), the counter value of the counter 519 is reset to zero in response to the trailing edge upon switching from High level to Low level, and the carry output (COUT) is cleared to Low level. During a High-level period of a vertical detection window signal (VWDET), pulses synchronized with a horizontal sync signal HD are supplied to count the counter value in response to the trailing edges of the pulses. When the counter count value reaches a counter reference value (128), the carry output (COUT) is switched to High level to cancel prohibition of the vertical noise processing. In other words, during the number of lines before the cyclic calculation value falls within the predetermined range, the vertical noise processing is prohibited.

As described above, according to the second embodiment, the prohibition period of the vertical noise processing is set focusing attention on the absolute level of the cyclic calculation value. For this reason, even when the cyclic calculation value has changed due to a change in cyclic coefficient or under the influence of noise, the prohibition period of the vertical noise processing can flexibly cope with such changes, and an erroneous operation can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-168276, filed Jul. 16, 2009, and No. 2010-131510, filed Jun. 8, 2010, which are hereby incorporated by reference herein in their entirety.

What is claimed is:

1. An image processing apparatus comprising:
a noise removal circuit which removes noise from a pixel signal read out from an image sensor on which pixels are arranged in matrix when a level of the pixel signal readout falls outside a range defined by a first threshold level and a second threshold level with respect to a signal on an identical row;
a cyclic calculation circuit which makes a cyclic calculation between signals on the same column with respect to the pixel signal readout in which the noise is removed by said noise removal circuit; and
a column offset detection circuit which detects a column offset component for each column based on a calculation result of said cyclic calculation circuit,
wherein when a difference between a previously calculated cyclic calculation value and a current pixel signal value falls outside a range defined by a third threshold level and a fourth threshold level upon making the cyclic calculation by said cyclic calculation circuit, said column offset detection circuit detects the column offset component using a previously calculated cyclic calculation result without making the cyclic calculation using the current pixel signal value.

2. The apparatus according to claim 1, wherein the range defined by the third threshold level and the fourth threshold level is narrower than the range defined by the first threshold level and the second threshold level.

3. The apparatus according to claim 1, wherein said column offset detection circuit prohibits an operation for comparing the difference between the previously calculated cyclic calculation value and the current pixel signal value with the range defined by the third threshold level and the fourth threshold level during only a predetermined period after the beginning of a detection operation of said column offset detection circuit.

* * * * *